United States Patent
Brady et al.

(10) Patent No.: US 6,838,202 B2
(45) Date of Patent: Jan. 4, 2005

(54) FUEL CELL BIPOLAR PLATE HAVING A CONDUCTIVE FOAM AS A COOLANT LAYER

(75) Inventors: Brian K. Brady, North Chili, NY (US); Gerald W. Fly, Geneseo, NY (US)

(73) Assignee: General Motors Corporation, Detroit, MI (US)

( * ) Notice: Subject to any disclaimer, the term of this patent is extended or adjusted under 35 U.S.C. 154(b) by 64 days.

(21) Appl. No.: 10/224,140

(22) Filed: Aug. 19, 2002

(65) Prior Publication Data

US 2004/0033410 A1 Feb. 19, 2004

(51) Int. Cl.$^7$ .................. H01M 8/04; B05D 5/12; B32B 3/30

(52) U.S. Cl. .............. 429/26; 429/38; 429/39; 427/115; 427/124; 428/457; 428/566; 428/600; 428/613

(58) Field of Search .............. 429/26, 34, 38, 429/39; 428/457, 566, 600, 613, 615; 427/115, 124, 125; 419/2

(56) References Cited

U.S. PATENT DOCUMENTS

| | | | |
|---|---|---|---|
| 4,567,086 A | | 1/1986 | Fukuda et al. |
| 5,272,017 A | | 12/1993 | Swathirajan et al. |
| 5,316,871 A | | 5/1994 | Swathirajan et al. |
| 5,441,822 A | | 8/1995 | Yamashita et al. |
| 5,508,128 A | | 4/1996 | Akagi |
| 5,658,681 A | | 8/1997 | Sato et al. |
| 5,763,113 A | | 6/1998 | Meltser et al. |
| 5,776,624 A | * | 7/1998 | Neutzler ............. 429/26 |
| 5,972,521 A | * | 10/1999 | Huskamp et al. ........... 428/547 |
| 6,024,848 A | | 2/2000 | Dufner et al. |
| 6,037,073 A | | 3/2000 | Besmann et al. |
| 6,083,638 A | | 7/2000 | Taniguchi et al. |
| 6,085,965 A | * | 7/2000 | Schwartz et al. ........... 228/190 |
| 6,232,010 B1 | | 5/2001 | Cisar et al. |
| 6,379,833 B1 | | 4/2002 | Hill et al. |
| 6,663,994 B1 | * | 12/2003 | Fly et al. ............. 429/34 X |
| 2003/0096151 A1 | * | 5/2003 | Blunk et al. ............ 429/34 |
| 2003/0203260 A1 | * | 10/2003 | Lee ................ 429/26 |
| 2003/0228512 A1 | * | 12/2003 | Vyas et al. ............ 429/38 |

FOREIGN PATENT DOCUMENTS

| | | | | |
|---|---|---|---|---|
| GB | 2 339 067 A | 1/2000 | ............ | H01M/8/24 |
| JP | 409245820 | 9/1997 | ............ | H01M/8/02 |
| JP | 2002-151107 | 5/2002 | ............ | H01M/8/02 |
| WO | WO 98/35398 | 8/1998 | ............ | H01M/8/24 |
| WO | WO 98/50973 | 11/1998 | ............ | H01M/8/02 |
| WO | WO 02/05373 A1 | 1/2002 | ............ | H01M/8/02 |

OTHER PUBLICATIONS

European Search Report for Application EP 01 11 7392 dated Sep. 1, 2003.

Murphy, Oliver J. et al., Low–cost light weight high power density PEM fuel cell stack, 1998, Electrochimica Acta. vol. 43, No. 24, pp. 3829–3840.

International Search Report dated Aug. 28, 2002, International App. No. PCT/US02/07981.

International Search Report dated Nov. 29, 2002, Int'l. App. No. PCT/US02/05766.

* cited by examiner

Primary Examiner—Stephen J. Kalafut
(74) Attorney, Agent, or Firm—Cary W. Brooks, Esq.; Linda M. Deschere, Esq.

(57) ABSTRACT

A bipolar plate for use with a fuel cell is provided including an electrically conductive foam as a coolant layer between thin metal foil layers. The thin metal foil layers are provided with serpentine flow field patterns on a surface thereof.

23 Claims, 2 Drawing Sheets

FUEL CELL BIPOLAR PLATE HAVING A CONDUCTIVE FOAM AS A COOLANT LAYER

FIELD OF THE INVENTION

The present invention relates to fuel cells and more particularly, to a bipolar plate having a conductive foam as a coolant layer for use in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts.

The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. Fuel cells have been used as a power source in many applications. In PEM fuel cells, hydrogen ($H_2$) is the anode reactant (i.e., fuel) and oxygen is the cathode reactant (i.e., oxidant). Typical arrangements of multiple cells in a stack are described in U.S. Pat. No. 5,763,113, assigned to General Motors Corporation.

The electrically conductive elements sandwiching the MEAs may contain an array of channels or grooves in the faces thereof for distributing the fuel cell's gaseous reactants (i.e., hydrogen and oxygen in the form of air) over the surfaces of the respective cathode and anode. In the fuel cell stack, a plurality of cells are stacked together in electrical series while being separated one from the next by a gas impermeable, electrically conductive bipolar plate. Heretofore, the bipolar plate has served several functions including (1) as an electrically conductive gas separator element between two adjacent cells; (2) to distribute reactant gases across substantially the entire surface of the membrane; (3) to conduct electrical current between the anode of one cell and the cathode of the next adjacent cell in the stack; (4) to keep the reactant gases separated in order to prevent auto ignition; (5) to provide a support for the proton exchange membrane; and (6) in most cases to provide internal cooling passages therein defined through which a coolant flows to remove heat from the stack. The bipolar plate also accommodates the gas pressure loads associated with the reforming process as well as the compression loads on the plates. The bipolar plate includes a plurality of channels on one side and a plurality of channels on the other side with the channels on an individual side being separated by lands. The arrangement of the lands and the channels on both sides has to be such that the bipolar plate can withstand the compression loads, whereby the lands and the channels are arranged so the bipolar plate does not collapse or warp. A common arrangement of these flow channels in the bipolar plate includes preferred serpentine channels to deliver the hydrogen and oxygen to a proton exchange membrane assembly overlying the bipolar plates. Neutzler, U.S. Pat. No. 5,776,624, discloses a metal bipolar plate and PEM assembly of this channel type.

Efficient operation of a fuel cell system depends on the ability of the fuel cell to generate a significant amount of electrical energy for a given size, weight, and cost of the fuel cell. Maximizing the electrical energy output of the fuel cell for a given size, weight, and cost is especially important in motor vehicle applications where size, weight, and cost of all vehicular components are especially critical to the efficient manufacture and operation of the vehicle. Therefore it is desirable, especially for motor vehicle applications, to provide a fuel cell construction which will generate an increased amount of electrical energy for a given size, weight, and cost of the fuel cell.

SUMMARY OF THE INVENTION

The present invention relates to a fuel cell including a membrane electrode assembly (MEA) having an anode catalyst on one face and a cathode catalyst on another face. A pair of bipolar plate assemblies are disposed on opposite sides of the membrane electrode assembly with the bipolar plate assemblies each including an electrically conductive porous core material and first and second metal foil layers bonded to first and second surfaces of the conductive porous material. The electrically conductive porous material defines a coolant flow passage therein and the first and second metal foil layers are formed to define reactant gas channels thereon.

According to a further feature of the invention, the electrically conductive porous material is diffusion bonded or brazed to the first and second metal foil layers.

According to a further feature of the invention, the first and second metal foil layers have a thickness of approximately 0.001 inch.

According to a further feature of the invention, the electrically conductive porous material comprises either a conductive graphite foam media or a conductive metallic foam media. The use of these relatively inexpensive conductive foam medias further contributes to the reduction in cost and weight of the fuel cell without any sacrifice in performance.

According to a further feature of the invention, a method of making the bipolar plate is provided in which first and second thin metal foil layers are bonded to a porous electrically conductive material and the first and second thin metal foil layers are stamped to provide a flow field pattern into the first and second thin metal foils.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
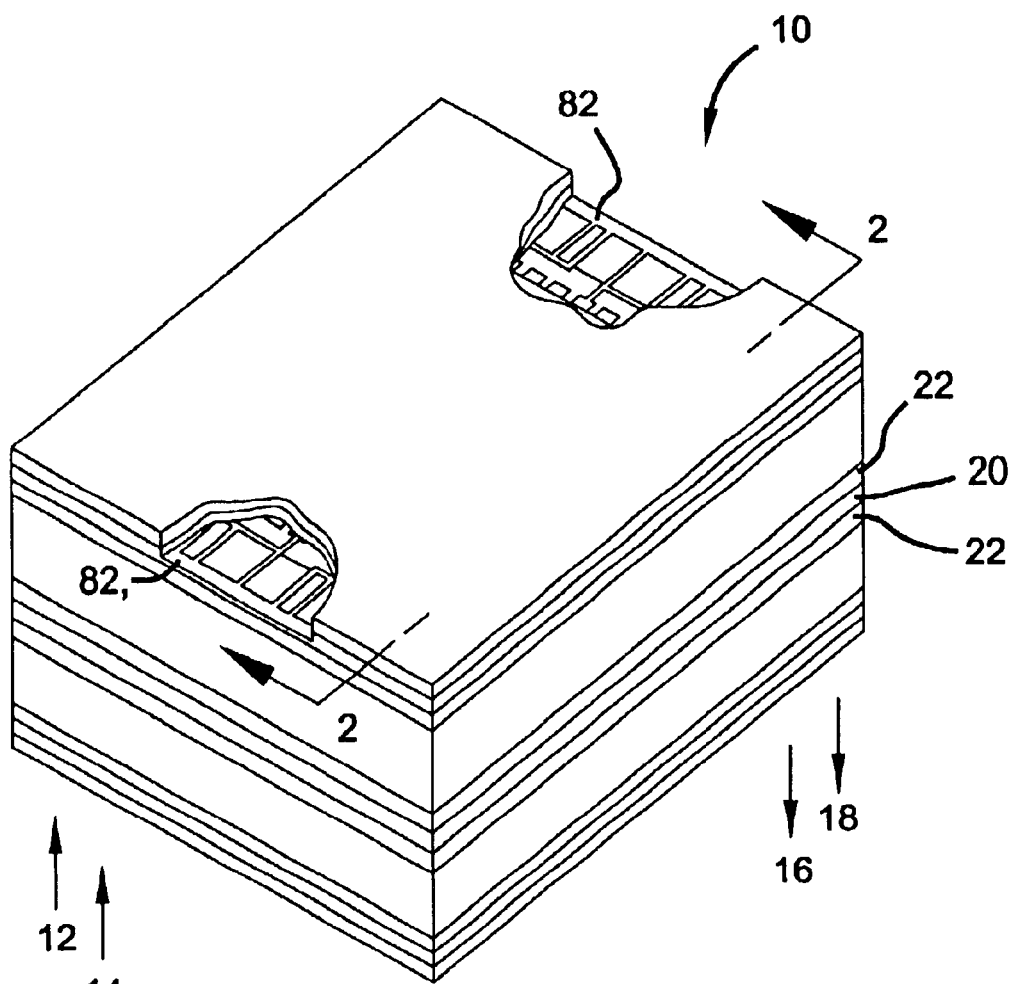
FIG. 1 is a schematic perspective view of a fuel cell stack according to the invention.

The present invention is directed to a fuel cell 10 and particularly the construction of the fuel cell whereby the fuel cell may be made lighter, smaller, and less expensively without a sacrifice in performance. The fuel cell 10 is seen schematically and perspectively in FIG. 1. Broadly considered, reformate 12 and air 14 are delivered to the fuel cell stack and oxygen depleted air 16 and hydrogen effluent 18 are exhausted from the stack.

In overview, the stack includes a plurality of membrane electrode assemblies (MEA) 20 each disposed between a plurality of bipolar plates 22. As is known in the art, the stack may also include a plurality of gas distribution layers, a plurality of anode manifolds, a plurality of cathode manifolds, a plurality of coolant manifolds, and upper and lower end plates, all arranged in stacked relation. The sequence of MEAs and bipolar plates is repeated to provide as necessary as determined by the desired voltage output for the fuel cell.

Figure 2:
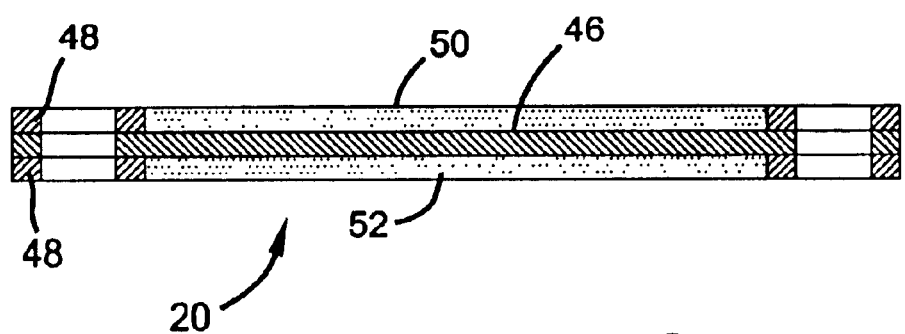
FIG. 2 is a cross-sectional view of an MEA utilized in the fuel cell.

Each MEA 20 (FIG. 2) includes a membrane 46 in the form of a thin proton transmissive non-electrically conductive solid polymer electrolyte, a seal or gasket frame member 48 positioned against the lower face of the membrane, a further seal or gasket 48 positioned against the upper face of the membrane, an anode catalyst layer 50 on the upper face of the membrane within the upper gasket 48, and a cathode catalyst layer 52 on the lower face of the membrane within the lower gasket 48.

Figure 3:
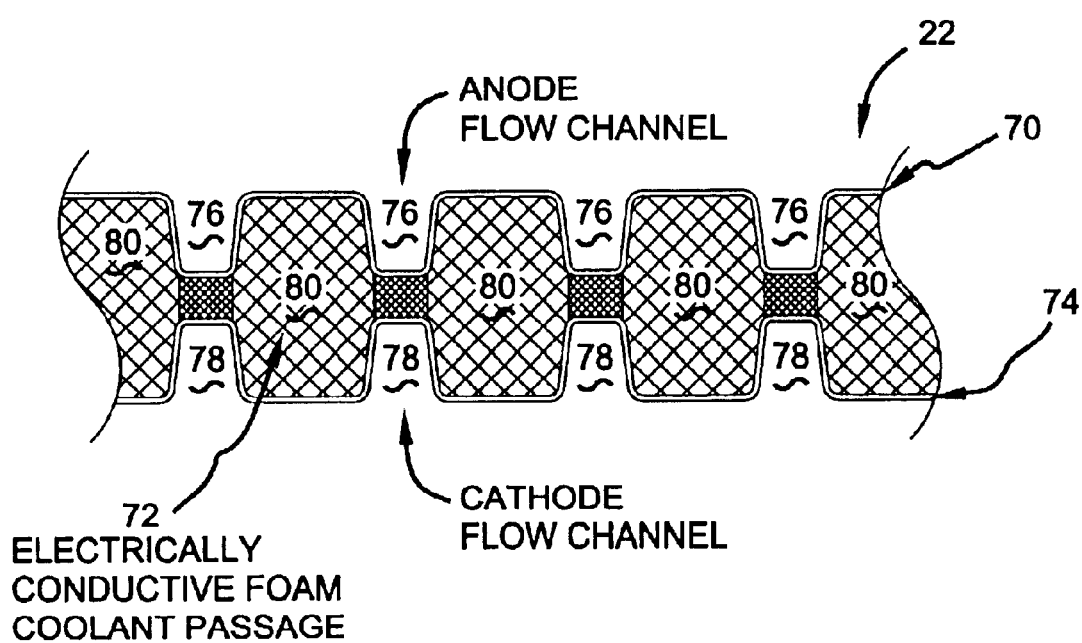
FIG. 3 is a cross-sectional view of a bipolar plate according to the principles of the present invention.

The bipolar plates 22 of the present invention, as best shown in FIG. 3, include a first thin metal foil 70 that is bonded to an electrically conductive porous material 72 such as a metal or carbon foam. The foam has a pore size of less than 0.02 inches and preferably approximately 0.005 to 0.01 inches. The metal or carbon foam has a pore size and permeability that allows for coolant pressure drops that allow for adequate heat rejection, pressure drops, and to keep the thickness to a minimum. A second thin metal foil 74 is bonded to a second side of the electrically conductive foam 72. The first and second thin metal foil layers have a thickness of less than 0.005 inches and preferably about 0.001 inches. The metal foils can be different materials to accommodate the differences in anode and cathode environments. A flow field pattern is then stamped into the material to provide anode and cathode gas channels 76,78 and also to locally compress the foam material to a much higher density subjacent anode flow channel 76. In this manner, regions of low density are bounded by regions of high density to form coolant channels 80 for the coolant to flow therethrough. The regions of high density also increase the conductivity of the bipolar plate by decreasing the bulk resistance in the area of the high density regions. As presently preferred, the anode and cathode flow channels 76,78 are arranged in a serpentine geometry. However, a skilled practitioner will recognize that other flow field geometries such as parallel, interdigitated or concentric geometries may be utilized in the present invention.

Preferably a metallic foam is used such that the foam material could be diffusion bonded, brazed, or otherwise bonded to the thin metal foil layers 70, 74 that form the flow field channels. The metallic foam is deformable in the stamping operation of the metal foil layers 70, 74 and the density differences within the foam 72 which is desirable to control flow, would be formed in situ. Alternatively, a graphite or carbon foam could be utilized which would be cut or formed into shape with high and low density regions and the metal foil could then be formed to shape and bonded to the graphite or carbon foam layers.

A header 82 is disposed around the bipolar plates to receive reactant gases and coolant therethrough. The header 82 works in cooperation with gaskets 48 to communicate reactant gases to the flow channels 76,78 and coolant to channels 80. The header 82 is formed in the bonding step of the foam to the thin metal flow fields by putting another thin sheet of metal in place of the foam out at the header areas on the perimeter of the bipolar plate. The third sheet of metal has flow paths already formed therein. The gaskets 48 function to seal header 82 from flow channels 76, 78 80 except for a respective flow path, i.e. anode header to flow channel 76, cathode header to flow channel 78 and coolant header to flow channel 80.

An alternative method for forming the bipolar plates is to start with a precursor foam (i.e., a polyurethane foam with metalized surface) between the thin metal foils that have already been stamped to form. The sandwiched structure is then heated to a foam sintering temperature to bond the metal foam 72 between the metal foil layers 70, 74. This method provides a sintering of the metal foam to the metal foil layers in-situ providing a bond that would be strong and minimizing contact resistance resulting in essentially no interface voltage loss.

Another method involves providing a foam material such as a polyurethane foam that is washed in a slurry of binder and metal powder. The material is then placed between two stamped foil layers and then fired to drive the foam material away leaving the binder and metal particles remaining in the form of the voids of the foam. The binder is then further burned away leaving the metal particles sintered together and sintered to the foil layers.

A still further method involves plating, or otherwise depositing metal (such as by chemical vapor deposition), onto a foam material sandwiched between first and second foil layers. The foam material is also bonded to the foil layers during the plating or deposition process.

According to the present invention, a very light bipolar plate is provided that can utilize much of the current technology using tested flow field designs, pressure drops, MEAs, diffusion media, gasket designs, etc. The present invention is also more adaptable to different optimized flow field and header designs. The bipolar plate design of the present invention has several advantages as compared to the present flow field/bipolar plate designs. The bipolar plate of the present invention is lighter, utilizing approximately 0.001 inch thick metal foil as opposed to prior designs which utilize a 0.03 inch thick plate material. Coolant efficiency is improved since there is more coolant per unit area in contact with the bipolar plate and also because the heat transfer is better because of the much thinner metal. The present design can utilize metals that are inherently more dense and corrosion resistant in the fuel cell environment, such as stainless steel or titanium because the foil is so thin. The repeat distance is minimized and therefore, the volumetric power density is increased. The foam acts as a support for the foil and therefore provides a very light, strong, thin plate. The weight is reduced and therefore, the gravimetric power density is increased. In addition, it is possible to use this type of design as an air-cooled stack if the non-header sides are not sealed. However, in the air-cooled configuration the thickness of the foam would need to be increased to achieve a sufficient flow rate of air through the stack to accommodate the thermal load.

The invention provides a fuel cell which is lighter and less expensive than the comparable prior art fuel cells without any sacrifice in the electrical energy output by the fuel cell. Specifically, the substitution of a bipolar plate having a conductive foam core layer defining a coolant passage, in place of the prior art metallic bipolar plate, reduces the weight of the fuel cell.

What is claimed is:

1. A bipolar plate for use in a fuel cell, comprising:
   an electrically conductive porous material;
   a first metal foil layer bonded to a first surface of said conductive porous material; and
   a second metal foil layer bonded to a second surface of said conductive porous material, said electrically conductive porous material defining a coolant flow passage therein and said first and second metal foil layers being formed to define reactant gas channels thereon.

2. The bipolar plate according to claim 1, wherein said electrically conductive porous material is a metallic foam.

3. The bipolar plate according to claim 1, wherein said first and second metal foil layers have a thickness of less than 0.005 inch.

4. The bipolar plate according to claim 1, wherein said electrically conductive porous material is diffusion bonded to said first and second metal foil layers.

5. The bipolar plate according to claim 1, wherein said electrically conductive porous material is brazed to said first and second metal foil layers.

6. The bipolar plate according to claim 1, wherein said electrically conductive porous material is a graphite foam.

7. The bipolar plate according to claim 1, wherein said electrically conductive porous material is a carbon foam.

8. The bipolar plate according to claim 1, wherein said electrically conductive porous material has regions of low density defining flow channels which are bounded by regions of high density electrically conductive porous material within said coolant flow passage.

9. A fuel cell, comprising:
   a membrane electrode assembly including an anode catalyst on one face and a cathode catalyst on another face;
   a pair of bipolar plates disposed on opposite sides of said membrane electrode assembly said bipolar plates each including an electrically conductive porous material, a first metal foil layer bonded to a first surface of said conductive porous material, and a second metal foil layer bonded to a second surface of said conductive porous material, said electrically conductive porous material defining a coolant flow passage therein and said first and second metal foil layers being formed to define reactant gas channels thereon.

10. The fuel cell according to claim 9, wherein said electrically conductive porous material is a metallic foam.

11. The fuel cell according to claim 9, wherein said first and second metal foil layers have a thickness of less than 0.005 inch.

12. The fuel cell according to claim 9, wherein said electrically conductive porous material is diffusion bonded to said first and second metal foil layers.

13. The fuel cell according to claim 9, wherein said electrically conductive porous material is brazed to said first and second metal foil layers.

14. The fuel cell according to claim 9, wherein said electrically conductive porous material is a graphite foam.

15. The fuel cell according to claim 9, wherein said electrically conductive porous material is a carbon foam.

16. A method of forming a bipolar plate for use in a fuel cell, comprising the steps of:
   bonding a first metal foil to a first side of a porous electrically conductive material;
   bonding a second metal foil to a second side of a porous electrically conductive material;
   patterning the first and second metal foils to form respective flow field pattern; and
   installing the bipolar plate in a fuel cell.

17. The method according to claim 16, wherein said porous electrically conductive material is a metal foam.

18. A method of forming a bipolar plate for use in a fuel cell, comprising the steps of:
   bonding a first metal foil to a first side of a porous electrically conductive material;
   bonding a second metal foil to a second side of a porous electrically conductive material;
   patterning the first and second metal foils to form respective flow field patterns,
   wherein said porous electrically conductive material is a graphite foam.

19. A method of forming a bipolar plate for use in a fuel cell, comprising the steps of:
   bonding a first metal foil to a first side of a porous electrically conductive material;
   bonding a second metal foil to a second side of a porous electrically conductive material;
   patterning the first and second metal foils to form respective flow field patterns,
   wherein said porous electrically conductive material is a carbon foam.

20. A method of forming a bipolar plate for use in a fuel cell, comprising the steps of:
   bonding a first metal foil to a first side of a porous electrically conductive material;
   bonding a second metal foil to a second side of a porous electrically conductive material;
   patterning the first and second metal foils to form respective flow field patterns,
   wherein said first and second metal foil layers have a thickness of less than 0.005 inch.

21. A method of forming a bipolar plate for use in a fuel cell, comprising the steps of:
   patterning a first metal foil layer and patterning a second metal foil layer to form respective flow field patterns;
   placing a foam material with a metalized surface between said first and second metal foil layers in a sandwiched structure;
   heating said sandwiched structure to a temperature sufficient to sinter said metal foam to said first and second metal foil; and
   installing the bipolar plate in a fuel cell.

22. A method of forming a bipolar plate for use in a fuel cell, comprising the steps of:
   soaking a foam material in a slurry of binder and metal powder;
   placing the foam material between two foil layers; and
   firing the two foil layers with the foam material therebetween until the metal powder is sintered to the foil layers.

23. A method of forming a bipolar plate for use in a fuel cell, comprising the steps of:
   providing a foam material between first and second foil layers; and
   depositing metal onto the foam material between the first and second foil layers using chemical vapor deposition.

* * * * *